(12) United States Patent
Wu et al.

(10) Patent No.: US 6,614,983 B2
(45) Date of Patent: Sep. 2, 2003

(54) VARIABLE OPTICAL ATTENUATOR (75) Inventors: Kun-Tsan Wu, Tu-Chen (TW); Chien Cheng Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 26 days.

(21) Appl. No.: 10/033,687

(22) Filed: Dec. 27, 2001

(65) Prior Publication Data
US 2003/0091319 A1 May 15, 2003

(30) Foreign Application Priority Data
Nov. 15, 2001 (TW) .......................................... 90219631

(51) Int. Cl.⁷ ................................................ G02B 6/00
(52) U.S. Cl. ....................................................... 385/140
(58) Field of Search ................................... 385/33, 140

(56) References Cited
U.S. PATENT DOCUMENTS 4,989,938 A * 2/1991 Tamulevich .................. 385/33
5,087,122 A * 2/1992 Ostrander et al. ......... 356/73.1
6,483,982 B1 * 11/2002 Takahashi .................... 385/140

* cited by examiner

Primary Examiner—Robert H. Kim
Assistant Examiner—Therese Barber
(74) Attorney, Agent, or Firm—Wei Te Chung (57) ABSTRACT

A variable optical attenuator (10) comprises a base (12), a cover (13), an attenuation device (11), and optical fibers (17, 18). The attenuation device comprises a fixed collimator (111), a movable collimator (112), a holding device (113), and an adjusting device (117). The two collimators are aligned end-to-end. The holding device defines a passage (1131) in which the movable collimator is retained, and a threaded hole (1133). The adjusting device comprises a first screw rod (114), a second screw rod (115), and a rubber ring (116). The first screw rod comprises a thread portion (1141), a gear (1142), and a head (1143). The thread portion of the first screw rod is rotatably engaged in the threaded hole. The second screw rod comprises a thread portion (1151) and an adjusting slot (1153). The thread portion of the second screw rod meshes with the gear of the first screw rod.

9 Claims, 8 Drawing Sheets

VARIABLE OPTICAL ATTENUATOR

BACKGROUND OF THE INVENTION

1. Field of the Invention

The present invention relates to variable optical attenuators, and particularly to a variable optical attenuator which can precisely control the amount of optical attenuation.

2. Description of Prior Art

Attenuators are widely used in optical transmission systems for reducing high power transmission signals to acceptable signals for application in a variety of optical apparatuses.

Figure 1:
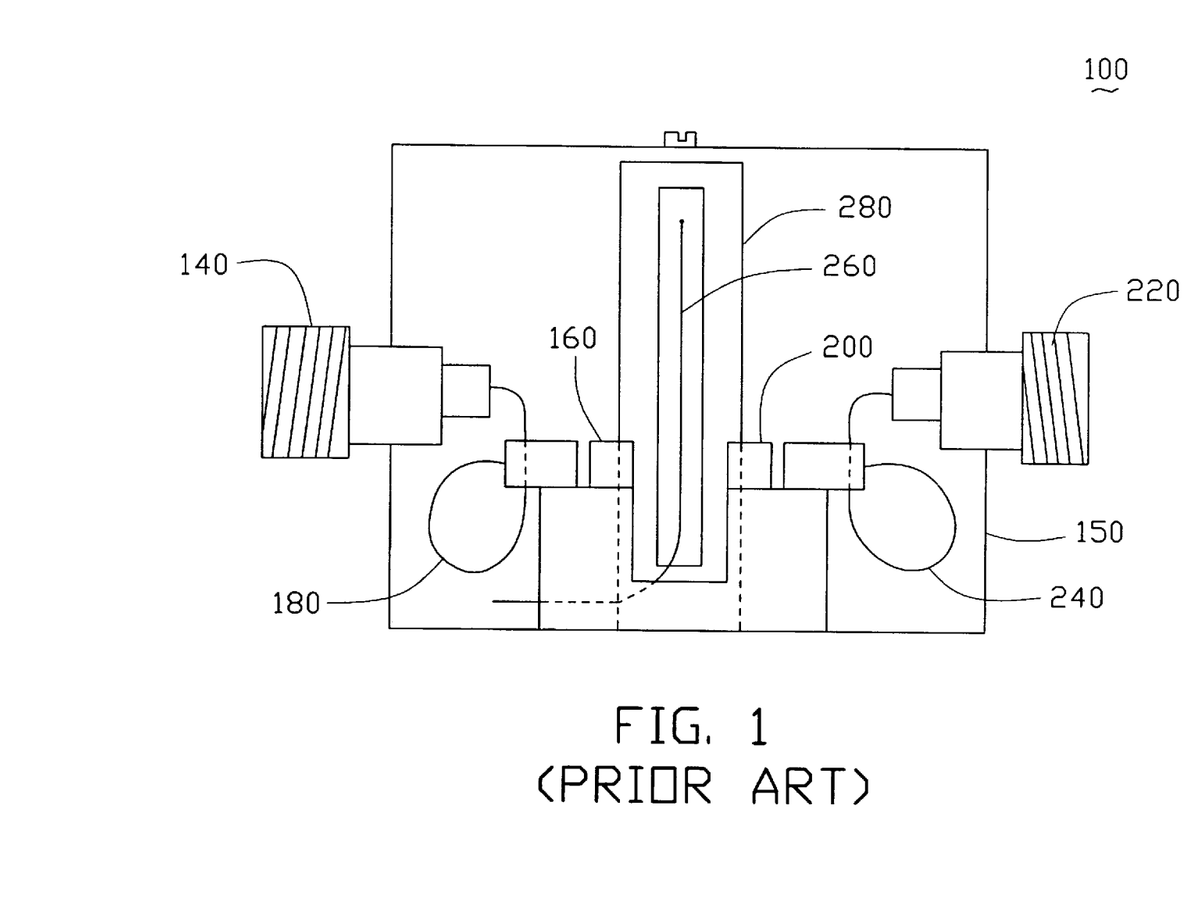
FIG. 1 is a schematic side plan view of a conventional variable optical attenuator.

FIG. 1 shows a variable optical attenuator as disclosed in U.S. Pat. No. 4,989,938. The variable optical attenuator 100 comprises a housing 150 containing a first optical fiber connector 140, a first optical lens 160, a first connecting optical fiber 180, a second optical lens 200 separated from the first optical lens 160 by an optical coupling space, a second optical fiber connector 220, a second connecting optical fiber 240, an optical filter 260 and a reciprocating means 280. The optical filter 260 is a flexible film having an optical density gradient which varies along a length of the filter 260. The filter 260 is preferably mounted substantially orthogonally to an optical axis of the optical coupling space.

When the filter 260 is moved vertically, a part of the filter 260 having a different optical density is put in a path of light passing through the optical coupling space. The filter 260 can thus control transmission and absorption of differing amounts of light. By varying the vertical position of the filter 260, the degree of light attenuation provided by the filter 260 can be varied. Nevertheless, it is difficult and expensive to manufacture the filter 260 to attain the necessary optical density gradient.

Thus, it is desired to provide a variable optical attenuator which is inexpensive to manufacture and which can precisely control the amount of optical attenuation.

SUMMARY OF THE INVENTION

Accordingly, an object of the present invention is to provide a variable optical attenuator which has low manufacturing cost.

Another object of the present invention is to provide a variable optical attenuator which can precisely control the degree of optical attenuation.

To achieve the above objects, a variable optical attenuator of the present invention comprises a base, a cover, an attenuation device and optical fibers. The attenuation device comprises a fixed collimator, a movable collimator, a holding device and an adjusting device. The two collimators are aligned end-to-end. The holding device defines a passage in which the movable collimator is retained, and a threaded hole. The adjusting device comprises a first screw rod, a second screw rod, and a rubber ring. The first screw rod comprises a thread portion, a gear, and a round head. The thread portion of the first screw rod is rotatably engaged in the threaded hole of the holding device. The second screw rod comprises a thread portion and an adjusting slot defined in a top face of the second screw rod. The thread portion of the second screw rod meshes with the gear of the first screw rod.

When the second screw rod is rotated via the adjusting slot, the thread portion of the second screw rod drives the gear to rotate the first screw rod, and the first screw rod rotatingly drives the holding device to move toward the head or away from the head. Thus an offset, if any, between the two collimators can be adjusted. Accordingly, an amount of optical attenuation of the attenuator can be precisely controlled via the two screw rods.

Other objects, advantages and novel features of the present invention will be drawn from the following detailed description of the preferred embodiment of the present invention with attached drawings, in which:

DETAILED DESCRIPTION OF PREFERRED EMBODIMENT

Figure 2:
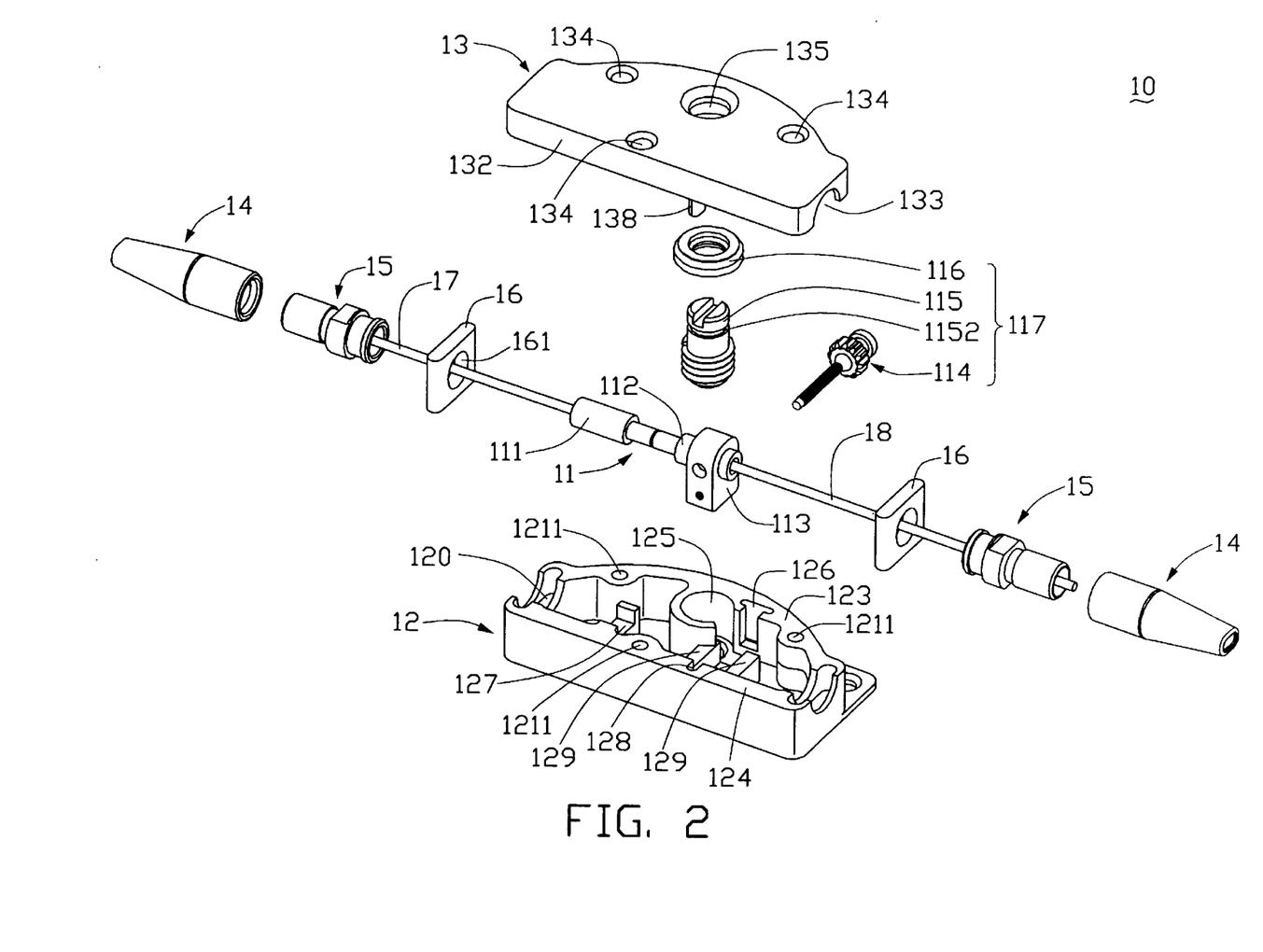
FIG. 2 is an exploded perspective view of a variable optical attenuator in accordance with the present invention.

Referring to FIG. 2, a variable optical attenuator 10 in accordance with the present invention comprises an attenuation device 11, a base 12, a cover 13, a pair of strain relief boots 14, a pair of retaining bodies 15, a pair of interconnection members 16 and optical fibers 17, 18.

Figure 3:
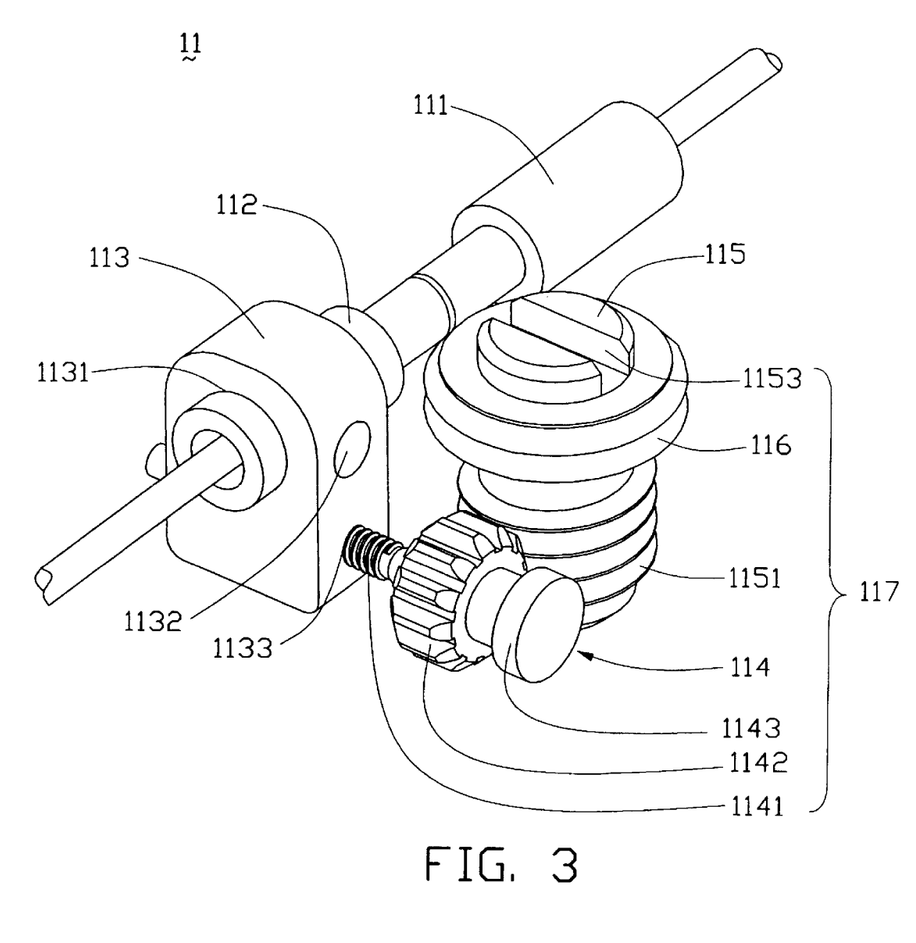
FIG. 3 is a perspective view of an adjusting device of the attenuator of FIG. 2.

Referring also to FIG. 3, the attenuation device 11 comprises a fixed collimator 111, a movable collimator 112, a holding device 113 and an adjusting device 117. The holding device 113 comprises an upper end with an arch-shaped configuration, and a rectangular lower end. A passage 1131 is longitudinally defined in the upper end of the holding device 113, for retaining the movable collimator 112 therein. A hole 1132 is laterally defined in the upper end of the holding device 113. The hole 1132 is orthogonal to and in communication with the passage 1131, for insertion of a bolt or epoxy thereinto to fasten the movable collimator 112 to the holding device 113. A threaded hole 1133 is laterally defined in the lower end of the holding device 113.

The adjusting device 117 comprises a first screw rod 114, a second screw rod 115 and a rubber ring 116. The first screw rod 114 comprises a thread portion 1141, a gear 1142, and a round head 1143. The head 1143 is formed at one end of the first screw rod 114. The thread portion 1141 is formed on a middle portion and on an opposite end of the first screw rod 114, for rotatably engaging in the threaded hole 1133 of the holding device 113. The gear 1142 is formed between the head 1143 and the thread portion 1141, for engaging with the second screw rod 115.

The second screw rod 115 comprises a thread portion or snail cam portion 1151 formed on a lower end thereof, a circumferential groove 1152 defined above the thread portion 1151, and an adjusting slot 1153 defined in a top face of the second screw rod 115. The thread portion 1151 is for engaging with the gear 1142 of the first screw rod 141. The circumferential groove 1152 is for receiving the rubber ring 116. The adjusting slot 1153 is for receiving a screwdriver to rotate the second screw rod 115.

Figure 4:
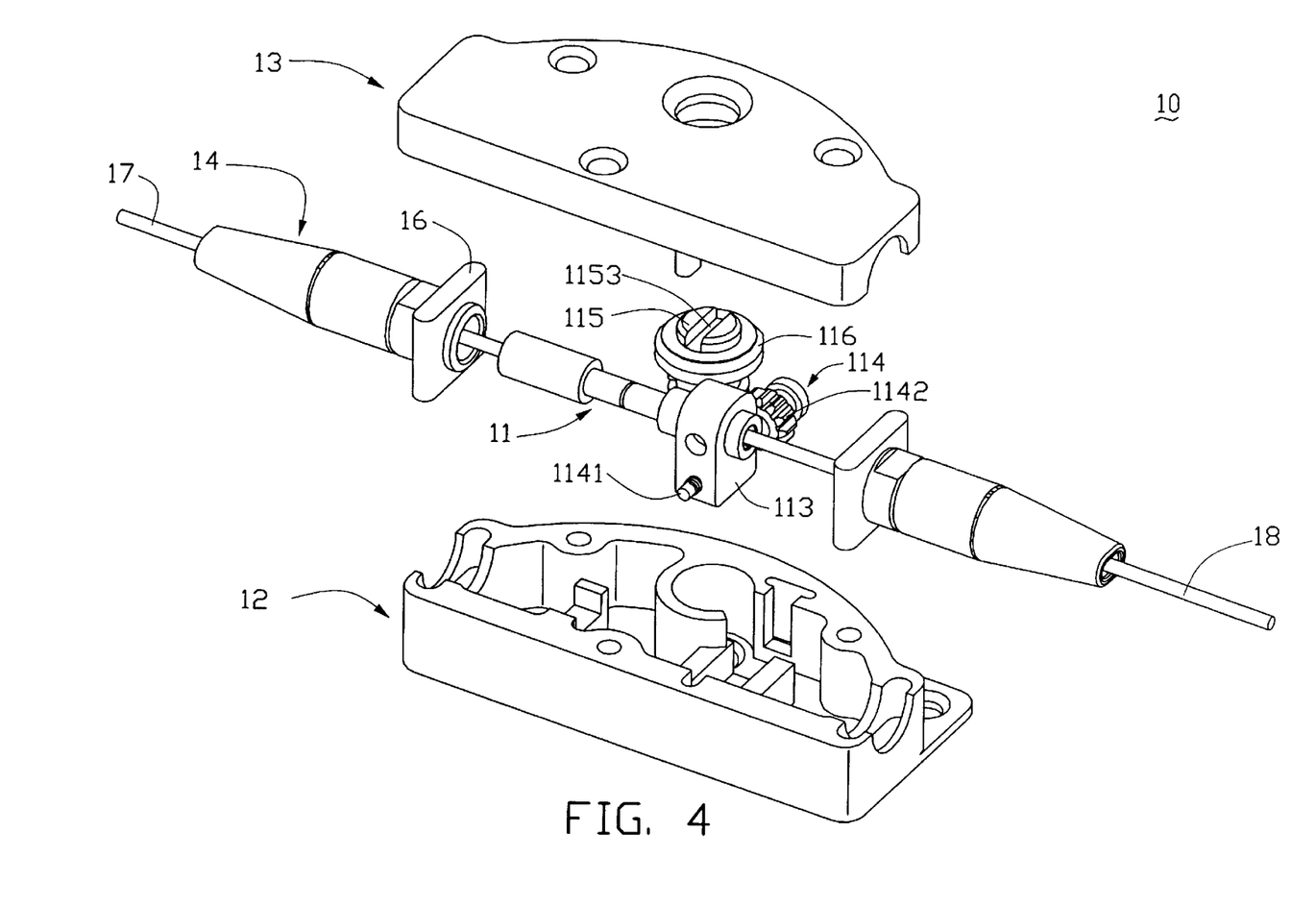
FIG. 4 is a partly assembled view of FIG. 2.
Figure 5:
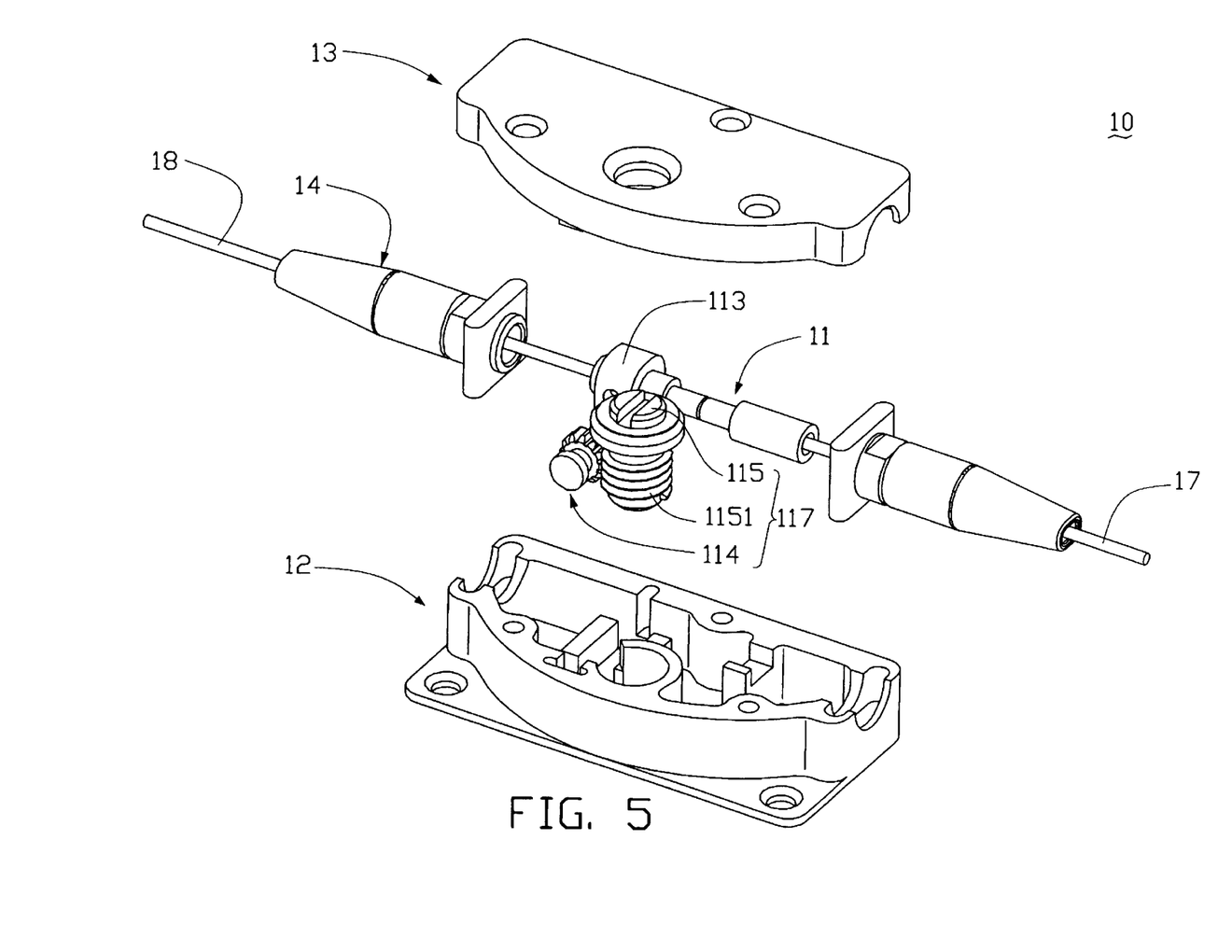
FIG. 5 is similar to FIG. 4, but viewed from another aspect.
Figure 7:
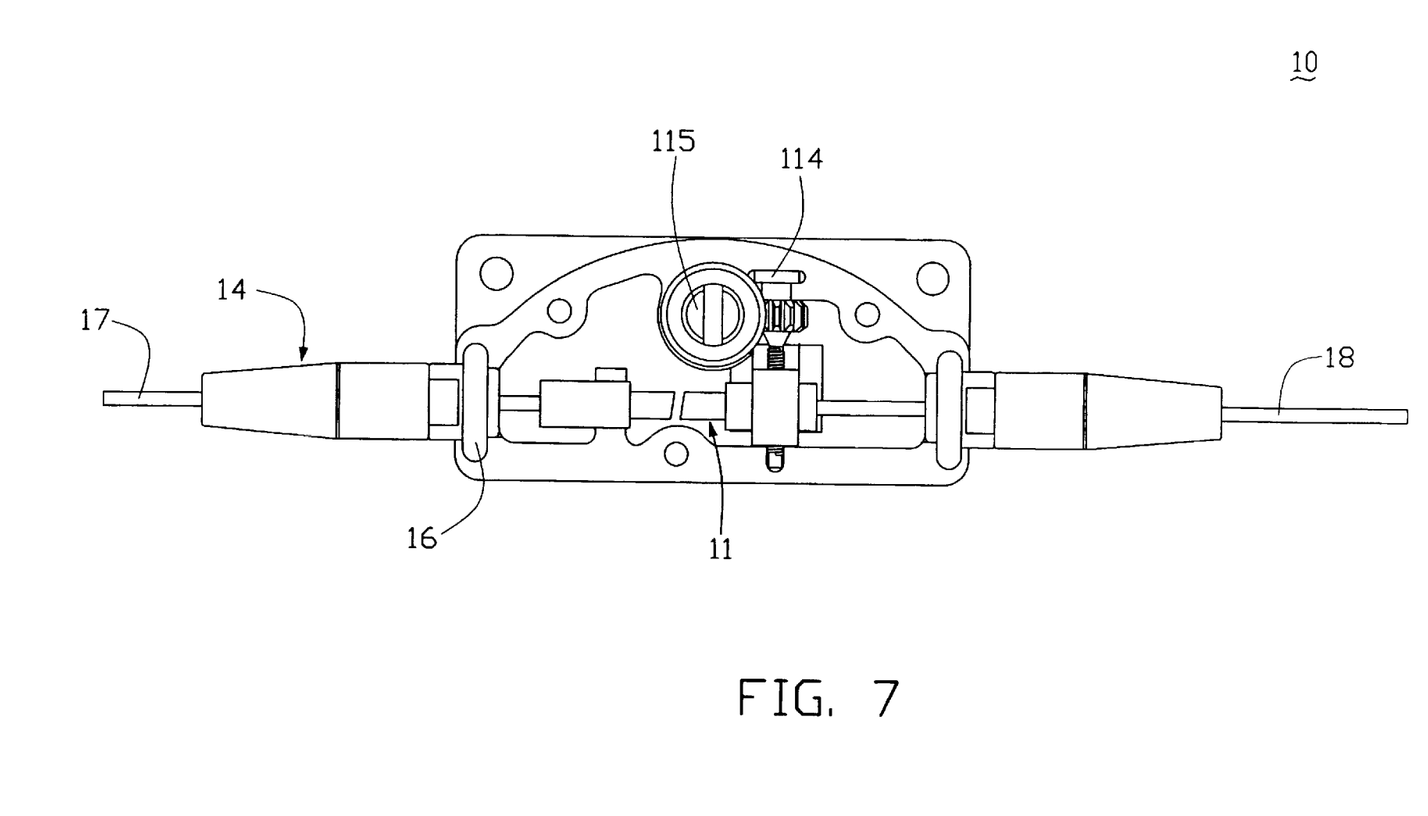
FIG. 7 is a top plan view of the attenuator of FIG. 2 fully assembled exception of a cover thereof.
Figure 8:
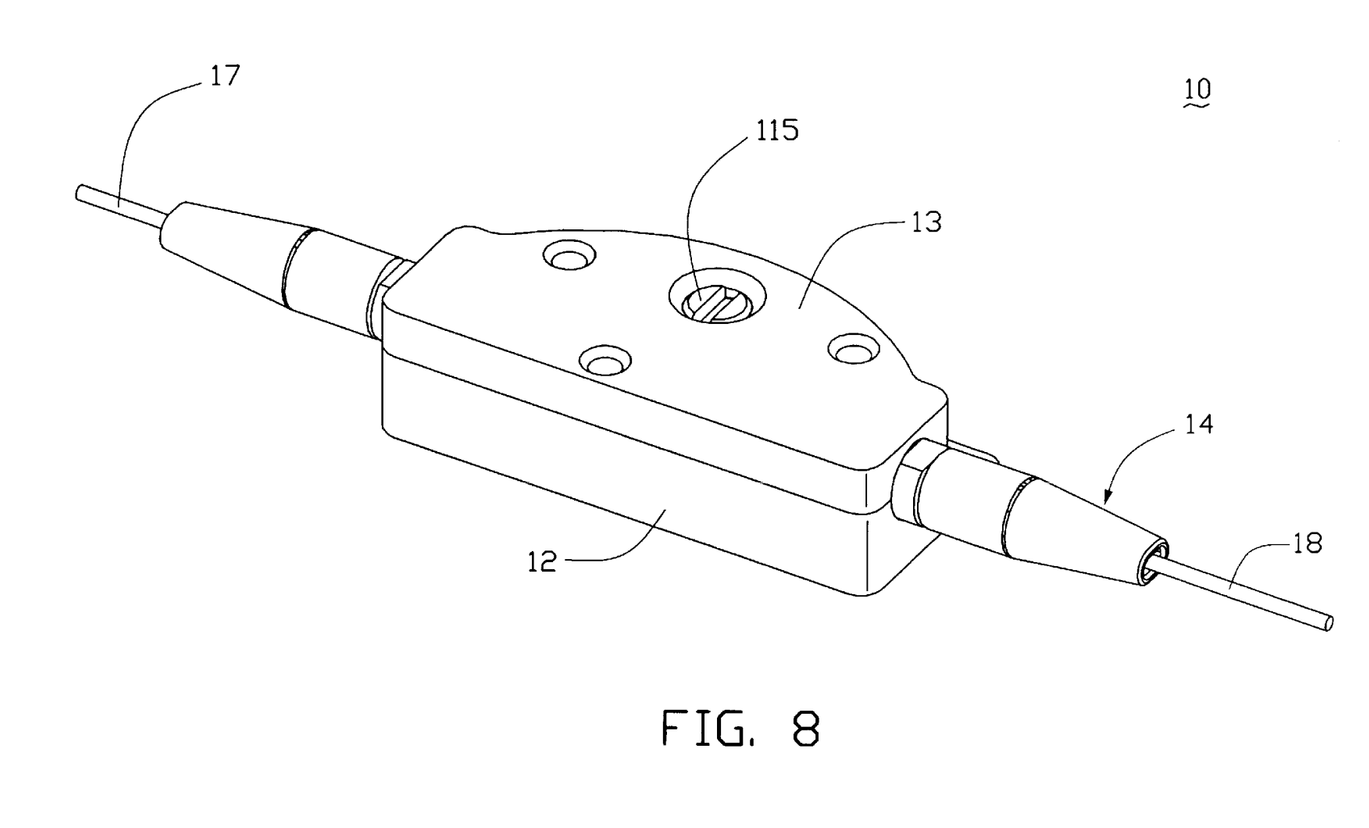
FIG. 8 is a fully assembled view of FIG. 2.

Referring to FIGS. 2, 4 and 7, the base 12 comprises a main wall (not labeled), an arcuate first sidewall 123, a second sidewall 124, and a pair of end walls (not labeled) respectively connecting opposite ends of the first and second sidewalls 123, 124. The first and second sidewalls 123, 124 and end walls extend upwardly from the main wall. Two retaining slots 120 are respectively defined in the end walls. Two spaced screw holes 1211 are defined in a top surface of the first sidewall 123. Another screw hole 1211 is defined in a top surface of a middle portion of the second sidewall 124. The three screw holes 1211 are thus arranged in a generally triangular formation. A round projection (not labeled) extends upwardly from a middle portion of the main wall, and is integrally joined with a middle portion of the first sidewall 123. A round hole 125 is defined in the round projection, for receiving and retaining the second screw rod 115 therein. A gap (not labeled) is defined in the round projection in communication with the round hole 125 and with an interior of the base 12. The gap enables the thread portion 1151 of the second screw rod 115 to engage with the gear 1142 of the first screw rod 114. A T-shaped slot 126 is defined in a top surface of the sidewall 123 near the gap, for receiving the head 1143 of the first screw rod 114. Two parallel ribs 129 extend upwardly from the main wall opposite to the T-shaped slot 126. The ribs 129 are orthogonal to the first and second sidewalls 123, 124, and define a lateral groove (not labeled) therebetween for receiving and retaining the holding device 113. A receiving groove 128 is defined in the second sidewall 124 generally between the ribs 129, for accommodating a distal end of the thread portion 1133 of the first screw rod 114. A rectangular projection (not labeled) extends upwardly from a middle portion of the main wall. The rectangular projection is integrally joined with the second sidewall 124, and spaced from the round projection and from the ribs 129. An inlet 127 is defined in the rectangular projection, for receiving and supporting the fixed collimator 111 therein.

Figure 6:
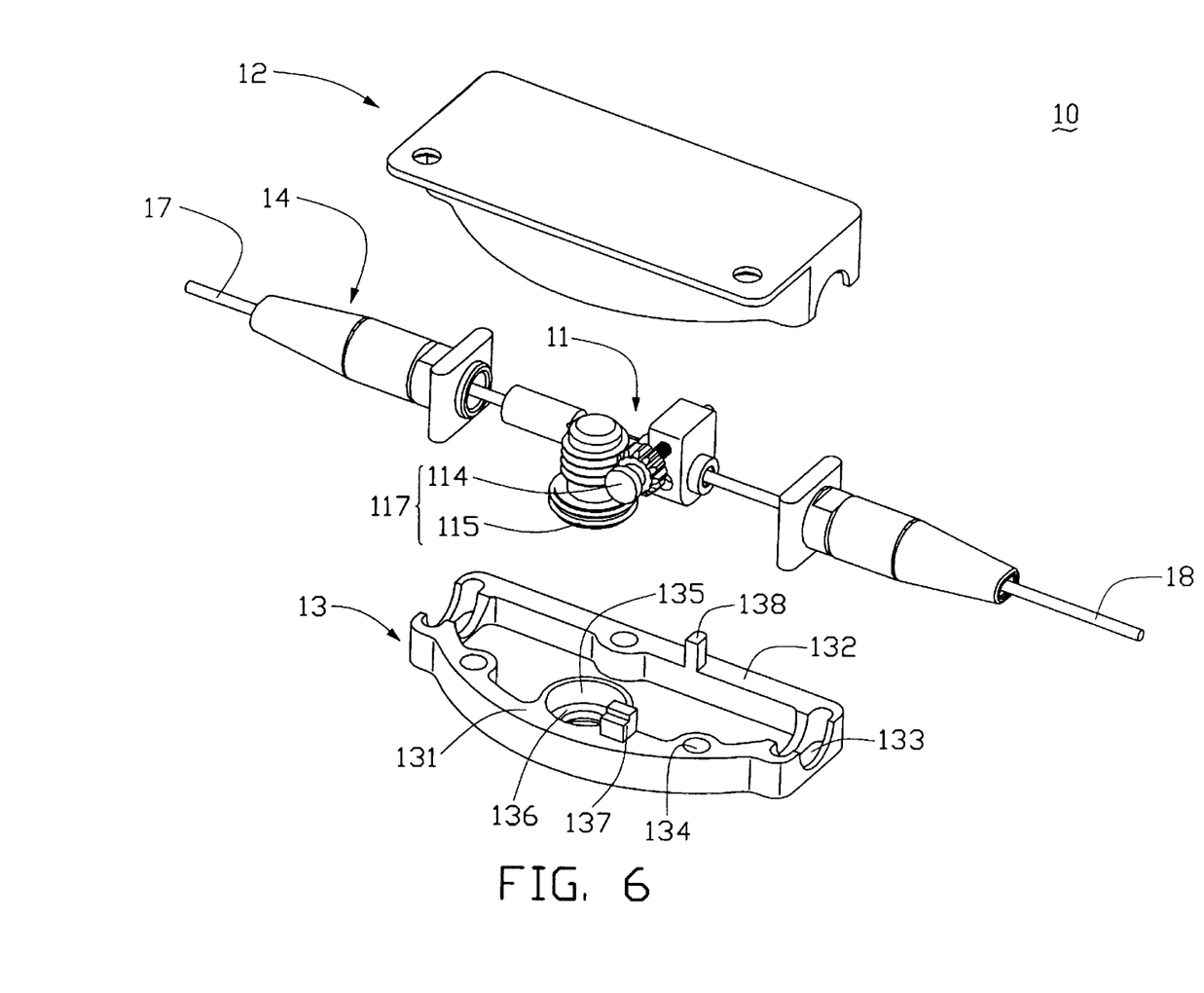
FIG. 6 is similar to FIG. 4, but viewed from a bottom aspect.

As best shown in FIG. 6, the cover 13 comprises a main wall (not labeled), an arcuate first sidewall 131, a second sidewall 132, and a pair of end walls (not labeled) respectively connecting opposite ends of the first and second sidewalls 131, 132. The first and second sidewalls 131, 132 and end walls depend from the main wall. Two retaining slots 133 are respectively defined in the end walls, corresponding to the retaining slots 120 of the base 12. Two spaced through holes 134 are defined in a bottom surface of the first sidewall 131. Another through hole 134 is defined in a middle portion of a bottom surface of the second sidewall 132, respectively. The three through holes 134 correspond to the screw holes 1211 of the base 12. A round projection (not labeled) depends from a middle portion of the main wall, and is integrally joined with a middle portion of the first sidewall 131. A round hole 135 is defined in the round projection, for receiving a top portion of the screw rod 115 therein. A circumferential shoulder 136 is formed on a top portion of the round projection in the round hole 135, for retaining the rubber ring 116 of the first screw rod 115. A T-shaped projection 137 is formed on the bottom surface of the second sidewall 131 near the round hole 135, corresponding to the T-shaped groove 126 of the base 12. A protrusion 138 is formed on a middle portion of the bottom surface of the second sidewall 132, corresponding to the receiving groove 128 of the base 12.

Each strain relief boot 14 is generally for guiding and protecting the corresponding optical fiber 17, 18. Each interconnection member 16 is generally rectangular. A passageway 161 is defined in each interconnection member 16, for extension of an end of a corresponding retaining body 15 therethrough.

Referring to FIGS. 1–8, to assemble the attenuator 10, the optical fiber 18 is sequentially extended through a corresponding strain relief boot 14, retaining body 15 and interconnection member 16. The optical fiber 18 is then retained in the movable collimator 112. The optical fiber 17 is sequentially extended through other strain relief boot 14, retaining body 15 and interconnection member 16. The optical fiber 17 is then retained in the fixed collimator 111. The movable collimator 112 is secured in the passage 1131 of the holding device 113. A bolt or epoxy is inserted into the hole 1132 of the holding device 113 to permanently secure the movable collimator 112 in the holding device 113. The thread portion 1141 of the first screw rod 114 is rotatably engaged in the threaded hole 1133 at one lateral side of the holding device 113, such that a distal end of the thread portion 1141 protrudes from an opposite lateral side of the holding device 113. An outer end of each retaining body 15 is snappingly engaged into a corresponding strain relief boot 14, and an inner end of each retaining body 15 is snappingly engaged into the passageway 161 of a corresponding interconnection member 16.

The aforementioned components are then assembled into the base 12. The interconnection members 16 are respectively retained in the retaining slots 120. The fixed collimator 111 is retained in the inlet 127. The second screw rod 115 is rotatably retained in the round hole 125. The holding device 113 is retained in the lateral groove (not labeled) between the ribs 129. The head 1143 of the first screw rod 114 is retained in the T-shaped groove 126. The gear 1142 of the first screw rod 114 and the thread portion 1151 of the second screw rod 115 are meshed with each other. The protruding distal end of the thread portion 1141 of the first screw rod 114 is retained in the receiving groove 128.

Then the cover 13 is secured to the base 12. The T-shaped projection 137 is inserted into the T-shaped groove 126, and prevents the head 1143 of the first screw rod 114 from being dislodged. The protrusion 138 is inserted in the receiving groove 128, and prevents the protruding distal end of the thread portion 1141 from being dislodged. The retaining slots 133 retain the interconnection members 16 therein. The second screw rod 115 at the adjusting slot 115 is rotatably accommodated in the round hole 135. The adjusting slot 115 is exposed to an exterior of the cover 13, so that a screwdriver can be easily engaged in the second screw rod 115. Three screws (not shown) are extended through the through holes 134 of the cover 13 to tightly engage in the screw holes 1211 of the base 12. The cover 13 and the base 12 are thereby firmly secured together.

In use, the thread portion 1141 of the first screw rod 114 is rotatably engaged in the threaded hole 1133 of the holding device 113. The gear 1142 and the thread portion 1151 are meshed with each other. When the second screw rod 115 is rotated via the adjusting slot 1153, the thread portion 1151 drives the gear 1142 to rotate the first screw rod 114, and the first screw rod 114 rotatingly drives the holding device 113 to move toward the head 1143 or away from the head 1143. Thus an offset, if any, between the two collimators 111 and 112 can be adjusted. Accordingly, an amount of optical attenuation of the attenuator 10 can be precisely controlled via the two screw rods 114, 115.

The attenuator 10 of the present invention is easily operated, and relatively inexpensive to manufacture. Furthermore, the amount of optical attenuation can be precisely controlled.

Although the present invention has been described with reference to a specific embodiment, it should be noted that the described embodiment is not necessarily exclusive and that various changes and modifications may be made to the described embodiment without departing from the scope of the invention as defined by the appended claims.

What is claimed is:

1. A variable optical attenuator comprising:

a first optical fiber;

a second optical fiber; and an attenuating device comprising a first collimator, a second collimator aligned with the first collimator and an adjusting device, the adjusting device comprising a first screw rod and a second screw rod, the first collimator retaining the first optical fiber therein, the second collimator retaining the second optical fiber therein; wherein the first screw rod is drivable by the second screw rod to cause lateral movement of the second collimator thereby controlling offset between the first collimator and the second collimator.

2. The variable optical attenuator in accordance with claim 1, wherein the first screw rod comprises a head formed at one end thereof, a thread portion formed at an opposite end thereof, and a gear formed between the thread portion and the head.

3. The variable optical attenuator in accordance with claim 1, wherein the second screw rod comprises a thread portion meshing with the gear of the first screw rod.

4. The variable optical attenuator in accordance with claim 3, wherein the second screw rod comprises an adjusting slot defined in a top face thereof, for facilitating rotation of the second screw rod.

5. The variable optical attenuator in accordance with claim 1, wherein the attenuating device further comprises a holding device, and the holding device defines a passage in which the second collimator is retained.

6. The variable optical attenuator in accordance with claim 5, wherein the holding device further defines a threaded hole therein perpendicular to the passage, and the thread portion of the first screw rod is rotatingably engaged in the threaded hole.

7. The variable optical attenuator in accordance with claim 1, wherein the variable optical attenuator further comprising a base and a cover; wherein the base and the cover cooperatively form a housing encasing and supporting the attenuating device.

8. A variable optical attenuator comprising:

a first optical fiber coupled to a fixed first collimator;

a second optical fiber coupled to a moveable second collimator, said second collimator being generally aligned with said first collimator in an alignment direction; wherein said second collimator is mounted on a holding device which is actuated to move, by a screw rod, along a transverse direction perpendicular to said alignment direction, so as to control attenuation effect between said first and second fibers.

9. The variable optical attenuator in accordance with claim 8, wherein said screw rod is actuated by another screw rod which can be manually operated from an exterior outside a casing enclosing said first and second collimators.

* * * * *